United States Patent [19]

Church

[11] Patent Number: 5,501,889
[45] Date of Patent: Mar. 26, 1996

[54] SUPPORT STRUCTURE FOR FORMING WREATHS

[76] Inventor: Dora I. Church, 23829 101st Pl. West, Edmonds, Wash. 98020

[21] Appl. No.: 322,439

[22] Filed: Oct. 13, 1994

[51] Int. Cl.⁶ .................................................. A47G 7/02
[52] U.S. Cl. .............................. 428/66.5; 428/10; 428/27; 428/99; 428/100; 248/27.8
[58] Field of Search .................................. 428/65, 10, 99, 428/100, 27; 248/27.8; 47/41.01

[56] References Cited

U.S. PATENT DOCUMENTS 2,849,822  9/1958  Bachman ................................. 428/10

Primary Examiner—Alexander S. Thomas
Attorney, Agent, or Firm—Christensen O'Connor Johnson & Kindness

[57] ABSTRACT

A support structure (10) for forming a wreath includes an annular backing ring (14) having a plurality of straps (16) connected thereto. Each strap is spaced apart from one another along the circumference of the backing ring, and includes a first portion (18) having a first engaging material for releasably engaging with a second engaging material; and a second portion (20) having a second engaging material for releasably engaging the first engaging material. In the preferred embodiment, a plurality of openings (22) or (24) are defined in the backing ring at spaced apart locations along the circumference of the backing ring, wherein a strap is inserted in at least some of the openings.

8 Claims, 2 Drawing Sheets

SUPPORT STRUCTURE FOR FORMING WREATHS

FIELD OF THE INVENTION

The present invention relates to support structures, and more particularly, to support structures for forming wreaths.

BACKGROUND OF THE INVENTION

Wreaths are a popular holiday decoration, especially during the Christmas holidays. Traditionally, wreaths are made from fresh tree boughs, such as douglas fir, cedar, hemlock, holly, etc. Boughs, or bundles of boughs are arranged end-to-end, such that a generally circular arrangement is formed, with boughs forming segments of the circular arrangement.

The boughs forming the wreath are usually discarded at the end of the holiday season because the boughs dry-out and become visually unappealing. In addition, dried boughs increase the risk of fire-hazard. Hence, wreaths made from fresh tree boughs are generally made at the start of each holiday season.

A problem with making wreaths, is connecting the boughs to one another to form a generally circular wreath. Probably the least satisfactory solution has been to use lengths of wire twisted together around the ends of two or more boughs to secure the boughs to one another. Most people find this method disadvantageous because it is difficult to join the boughs together in this manner to approximate a circle.

Other solutions attempt to overcome this disadvantage by providing an annular backing ring that the boughs can be held against to aid in forming a wreath that better approximates a circle. For example, in one such solution, a stiff wire is pre-formed into a backing ring. Pairs of tie wires that are bendable, project from spaced-apart locations around the circumference of the backing ring. A wreath is formed by placing a bough against the backing ring twisting a pair of tie wires together around the bough to hold the bough in place along the arc of the backing ring. The foregoing steps are repeated until a sufficient number of boughs have been wired end-to-end along the circumference of the backing ring to form a generally circular wreath.

Another solution has been to provide a flat annular backing ring, typically made of wood. A coarse wire mesh, such as chicken wire, is stapled along the circumference of the backing ring. Boughs are inserted through the wire mesh, such that the wire mesh holds the boughs along the arc of the backing ring. This procedure is repeated until a sufficient number of boughs have been inserted end-to-end along the circumference of the backing ring to form a generally circular wreath.

While satisfactory for some uses, the foregoing two solutions are disadvantageous for several reasons. First, both solutions employ wire that typically includes cut-ends which are sharp, and often cause injury to the person making the wreath. Additionally, when hanging the wreath on a door, or other surface, many times the wire scratches and damages the surface.

Second, wire that is stiff enough to securely hold the boughs in place along the arc of the backing ring, is difficult to bend to capture the boughs, or to bend to insert the boughs through the mesh that the wire forms. Conversely, at the end of the holiday season, it is difficult to bend the wire to release and/or remove the boughs.

Third, in both of the foregoing two solutions the boughs are usually discarded at the end of the holiday season, along with the backing ring and the wire connected thereto. Thus, the ring and its associated wire is generally not considered to be reusable.

Fourth, the wire is fastened in place along the backing ring. Thus, the wire cannot be easily repositioned along the backing ring should more or less wire be required to most esthetically hold the boughs in place.

Finally, wreaths are traditionally displayed outdoors, on the entrance door to a person's home. Thus, the backing ring and its associated wire is often exposed to rain, or other forms of moisture, which frequently causes the wire to rust. Further, if the backing ring is made of wood, often moisture causes the wood to deteriorate.

Accordingly, the present invention provides an improved solution for forming a wreath.

SUMMARY OF THE INVENTION

The invention provides a support structure for forming a wreath. The support structure includes an annular backing ring having a plurality of straps connected thereto the backing ring. Each strap is spaced apart from one another along the circumference of the backing ring, and includes a first portion having a first engaging material for releasably engaging with a second engaging material; and a second portion having a second engaging material for releasably engaging the first engaging material. In the preferred embodiment a plurality of first openings are defined in the backing ring at spaced apart locations along the circumference of the backing ring, wherein a strap is inserted in at least some of the openings.

Preferably, each first and second portion of each strap is formed from an elongate strip of material, having a first surface with the engaging material connected thereto forming the front side of each portion, and a second surface forming the rear side of each portion. Each strap is formed by joining the first and second portions to one another, with the rear side of each portion facing one another.

The present invention also provides a method for forming a wreath. The first step is to provide an annular backing ring. Next, a plurality of pairs of straps are connected to the backing ring at spaced apart locations along the circumference of the backing ring, wherein each pair of straps includes first and second straps. Then boughs are placed around the circumference of the backing ring, followed by releasably fastening the first and second straps of each pair of straps to one another around a bough to retain the bough against the backing ring.

In the preferred method, the step of connecting a plurality of pairs of straps to the backing ring includes several substeps. The initial substep is to form a plurality of first openings in the backing ring at spaced apart locations around the circumference of the backing ring. Next, a plurality of second openings are formed in the backing ring at spaced apart locations around the circumference of the backing ring, wherein each second opening corresponds to a first opening, and corresponding first and second openings are generally radially aligned. Subsequently, strips of material having first and second segments are provided, followed by inserting a strip of material in the first and second openings of at least some pairs of corresponding first and second openings such that the first segment of each strip of material forms a first strap, and the second segment of each strip forms a second strap.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
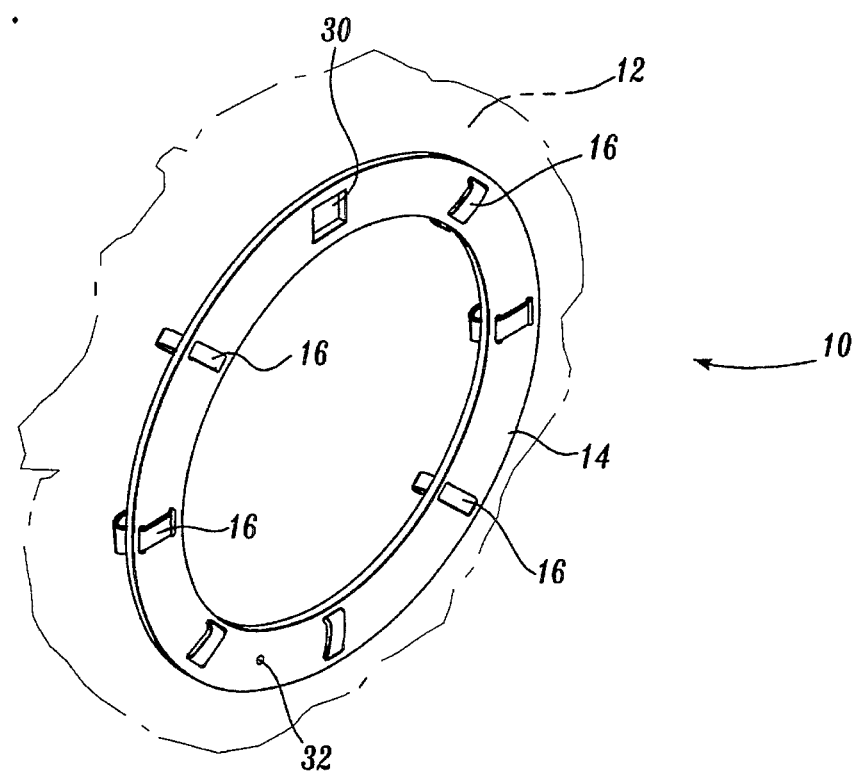
FIG. 1 is a rear perspective view of a preferred embodiment of a support structure formed in accordance with the present invention supporting a plurality of boughs.

Referring to FIG. 1, a support structure, indicated generally by reference numeral 10, supports a plurality of boughs 12 or other materials for making a wreath. Support structure 10 can also support other items for making a wreath such as silk, dried, or fresh flowers, stalks of wheat, rye, or cattails, feathers, ribbons, bows, and etc. in combination with, or in place of boughs.

Support structure 10 includes a generally flat, annular backing ring 14. In the preferred embodiment, backing ring 14 is formed of plastic. In alternative embodiments, backing ring 14 may be made of other materials that are moisture resistant, and have a smooth surface that will not catch, or scratch other objects or surfaces that the backing ring contacts. For example, backing ring 14 may be made of wood or metal having a smooth, finished surface that has been treated to be moisture resistant, such as by providing a coating of plastic or moisture resistant paint, or galvanizing the metal.

Figure 2:
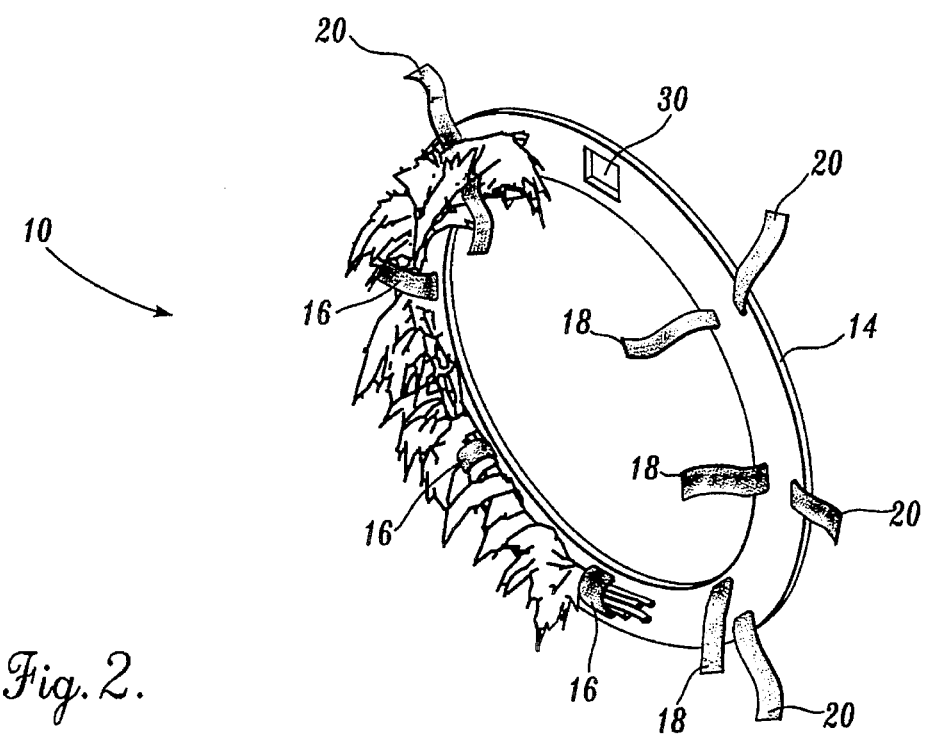
FIG. 2 is a front perspective view of the device of FIG. 1, with some of the boughs removed.
Figure 3:
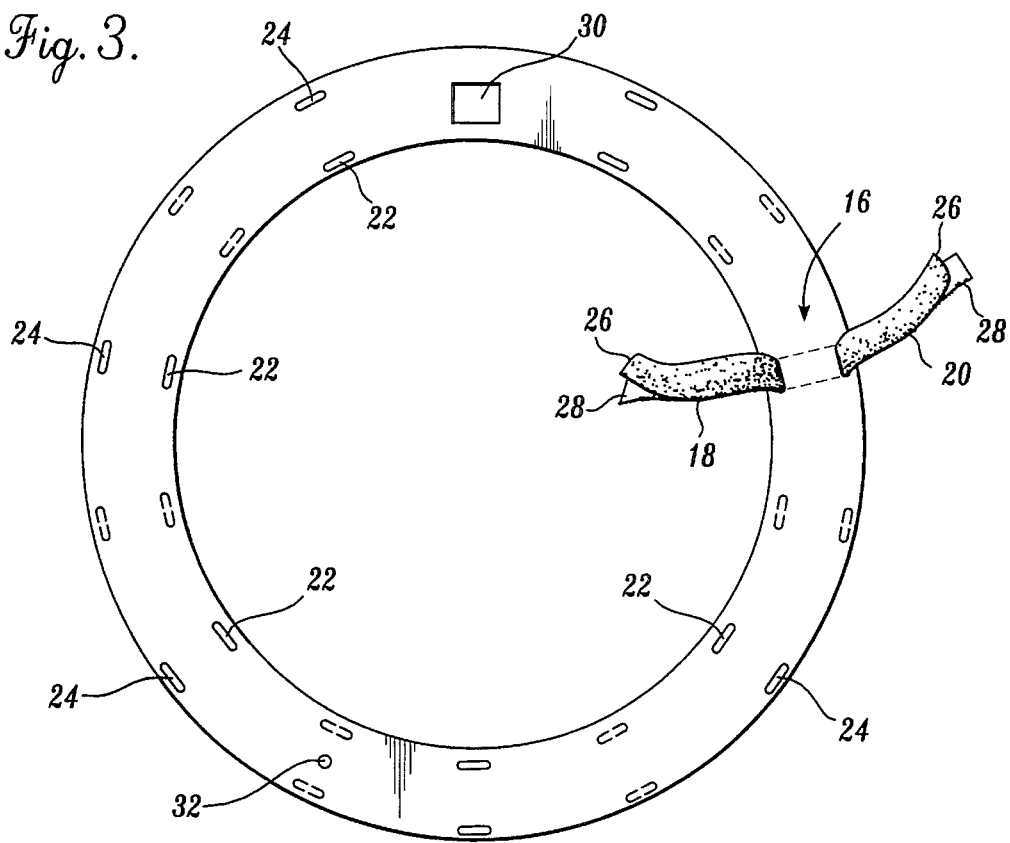
FIG. 3 is a front view of the support structure of FIG. 1 with the boughs removed and straps removed.

A plurality of straps 16 extend through the rear of backing ring 14 and hold boughs 12 against the front of the backing ring. Preferably, a plurality of openings 22 are formed through the plane of backing ring 14 at spaced apart locations along near the inner rim of the backing ring, as shown in FIG. 3, which is a front view of support structure 10 with the boughs 12 and straps 16 removed. The straps 16 are inserted through the openings 22, such that a first section 18 of each strap extends from the front of backing ring 14 as illustrated in FIG. 2. In the preferred embodiment the openings 22 are elongate, having a major axis approximately equal to the width of straps 16, for slidably receiving a strap. The openings 22 are formed through backing ring 14 such that the major axis of the elongate openings are generally transverse to the radii of the backing ring.

Referring to FIG. 3, a second set of openings 24 are also formed through the plane of backing ring 14 at spaced apart locations near the outer rim of backing ring 14. Each second opening 24 corresponds to a first opening 22, wherein the second openings 24 are formed nearer the outer rim of backing ring 14 than the first openings 22, such that corresponding first and second openings are generally radially aligned. The second openings 24 are substantially identical in shape to the first openings 22, and are also oriented with the major axis of each second opening 24 generally tangential to the arc of backing ring 14. Each strap 16 is also inserted through a second opening 24, such that each strap extends more-or-less radially along the rear side of backing ring 14 from an opening 22 to an opening 24 as shown in FIG. 1. Additionally, opposing sections 18 and 20 of each strap 16 respectively extend from openings 22 and 24 on the front side of backing ring 14 as shown in FIG. 2.

The sections 18 and 20 of straps 16 releasably fasten to one another around one or more boughs 12 to hold the bough(s) against the front of backing ring 14 as shown in FIG. 2. Preferably, sections 18 and 20 of a strap 16 includes fastening surfaces comprising hook and loop type fasteners, commonly sold under the trade name Velcro.

Sections 18 or 20 could include other types of releasable fasteners as well, such as clips, snaps, buckles, or etc. However, hook and loop type fasteners, commonly sold under the trade name Velcro, are preferred. Hook and loop type fasteners are easily fastened to one another around one or more boughs 12 by simply pressing section 18 of a strap 16, against the other section 20. Moreover, hook and loop type fasteners securely fasten to one another even when these sections are pressed together while under significant tension. Hence, hook and loop type fasteners can readily be used to snugly hold boughs 12 in place against backing ring 14.

In the preferred embodiment, one side of each strap 16 comprises hook type fasteners, while the other side comprises loop type fasteners. Preferably, a strap 16 is formed by joining a first strip of material having hook type fasteners on its front surface, with a second strip of material having loop type fasteners on it front surface. The first and second strips of material are joined together, with the rear sides of each strip facing one another, and the front side of each surface facing outwardly. A partially exploded view of a strap 16, formed of two joined strips 26 and 28 is shown in FIG. 3. In the preferred embodiment, strips 26 and 28 are sewn to one another. In other embodiments, strips 26 and 28 may be joined with adhesives, staples, plastic welding or other attachment methods.

In yet other alternative embodiments, straps 16 may be made of a single strip of material, wherein a patch of hook type fasteners are connected to one section 18 or 20 of a strap, while the other section has a patch of loop type fasteners connected thereto. Alternately, sections 18 and 20 may comprise individual straps, which are separately anchored to backing ring 14, rather than being sections of a single longer strap 16. In other embodiments, straps 16 need not be removable from openings 22 and 24. For example, straps 16 could be stapled, adhered, bolted, or screwed to backing ring 14. Further, openings 22 and 24 need not be provided through the plane of backing ring 14. Instead, the openings would only penetrate for short distance into the front surface of backing ring 14, such that a tunnel is formed in the backing ring between corresponding openings. Straps 16 would then be inserted through the tunnels.

As noted previously, support structure 10 is for holding boughs 12 along the arc of backing ring 14 for making a wreath. Boughs 12 are placed against the front side of backing ring 14, and held in place with straps 16. Preferably the boughs 12 are arranged, such that the end of a each bough 12 covers the strap 16 of an adjacent bough. Extra holes 22 and 24, shown in phantom in FIG. 3, are provided for repositioning straps 16 as desired by a person making a wreath. For example, a person may wish to form a wreath having boughs of different lengths in some sections of the wreath. Alternatively, extra straps 16 could be provided for the extra holes 22 and 24.

At the end of the holiday season, the straps 16 may be released on the boughs 12 discarded. The support structure 10 may then be stored for the next holiday season and used with fresh boughs.

Four-sided hole 30 is provided through backing ring 14 for hanging support structure 10 against a surface, when the support structure has been used to form a wreath. Standard wreath hangers provide a rectangular-shaped mount for hanging a wreath. Hence, four-side hole 30 is preferably substantially rectangular, and oriented with at least one its sides tangential to the arc of the backing ring for receiving a standard wreath mount.

Round hole 32 is defined through backing ring 14 on another portion of backing ring 14 from four-sided hole 30, for hanging a wreath formed with support structure 10. Round hole 32 may used if it is desired to not use a standard wreath hanger, and instead use a nail, hook, or other type of device for hanging a wreath.

Figure 4:
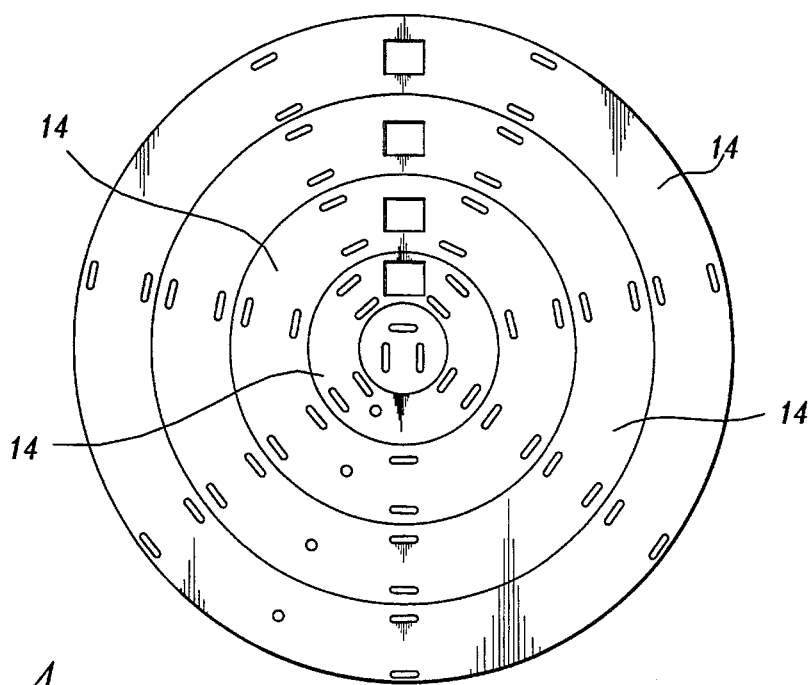
FIG. 4 is a front view of an arrangement for cutting a plurality of backing rings outs of a sheet of material.

Preferably, several different sized backing rings 14 are formed from a single sheet of backing ring material as shown in FIG. 4. Each smaller sized backing ring 14 is concentric within a larger sized backing ring, such that there is a minimum of waste.

While the preferred embodiment of the invention has been illustrated and described, it will be appreciated that various changes can be made therein without departing from the spirit and scope of the invention. For example, corresponding pairs of elongate openings need not be radially aligned; the straps need not be removably connected to the backing ring, but may be fastened to the backing ring in a variety of ways. Additionally, the straps may comprise a single strap having two sections that are fastenable to one another, or comprise separate straps forming strap pairs that are fastenable together. Since changes can be made to the illustrated embodiment of the invention, the scope of protection provided by Letters Patents granted herein is defined by reference to the claims and equivalents thereof.

The embodiments of the invention in which an exclusive property or privilege is claimed are defined as follows:

1. A support structure for forming a wreath, comprising:
   (a) an annular backing ring;
   (b) a plurality of straps connected to the backing ring, each strap being spaced from one another along the circumference of the backing ring, each strap including:
      (i) a first portion having a first engaging material for releasably engaging with a second engaging material; and
      (ii) a second portion having a second engaging material for releasably engaging the first engaging material; and
   (c) a plurality of first openings defined in the backing ring at spaced apart locations along the circumference of the backing ring, wherein a strap is inserted in at least some of the first openings.

2. The support structure of claim 1, further comprising a plurality of second openings defined in the backing ring at spaced apart locations around the circumference of the backing ring, each second opening corresponding to a first opening, wherein corresponding first and second openings generally radially align with one another, and wherein a strap is inserted in the first and second openings of at least some pairs of corresponding first and second openings.

3. The support structure of claim 2, wherein the straps are removably inserted in the first and second openings.

4. The support structure of claim 2, wherein the first and second openings are elongate.

5. The support structure of claim 1, wherein the first engaging material comprises a plurality of hooks, and the second engaging material comprises a plurality of loops.

6. A support structure for forming a wreath, comprising:
   (a) an annular backing ring;
   (b) a plurality of pairs of straps connected to the backing ring, each pair of straps comprising a first strap and a second strap, wherein each pair of straps is spaced apart from one another along the circumference of the backing ring; and
   (c) fastening means connected to the straps, the fastening means being for releasably fastening the first strap to the second strap wherein the first and second straps each have a front and rear side, and the first and second straps of each pair of straps are connected to one another along the length of each strap to form a joined strap pair, with the rear sides of the first strap facing the rear side of the second strap, and the fastening means releasably fastens the front side of one strap to the front side of another strap.

7. The support structure of claim 6, wherein each joined strap pair has opposite ends, the support structure further comprising a plurality of first openings defined through the backing ring at spaced apart locations along the circumference of the backing ring, and a plurality of second openings defined in the backing ring, each second opening corresponding to a first opening, wherein corresponding first and second openings generally radially align with one another, and wherein a joined strap pair is inserted in the first and second openings of at least some pairs of corresponding first and second openings, one end of the joined strap pair projecting from the first opening, and the opposite end of the joined strap pair projecting from the second opening.

8. The support structure of claim 6, wherein each joined strap pair is removably inserted in at least some pairs of corresponding first and second openings.

* * * * *